(12) United States Patent
Chauvel et al.

(10) Patent No.: US 6,310,657 B1
(45) Date of Patent: Oct. 30, 2001

(54) REAL TIME WINDOW ADDRESS CALCULATION FOR ON-SCREEN DISPLAY

(75) Inventors: Gerard Chauvel, Antibes; Serge Lasserre, Frejus; Mario Giani, Cagnes sur Mer, all of (FR); Tiemen Spits, North Richland Hills, TX (US); Gerard Benbassat, St-Paul-de-Vence (FR); Frank L. Laczko, Sr., Allen; Y. Paul Chiang, Richardson, both of TX (US); Karen L. Walker, Topeka, KS (US); Mark E. Paley, Dallas; Brian O. Chae, Plano, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/679,000

(22) Filed: Oct. 4, 2000

Related U.S. Application Data

(62) Division of application No. 08/962,514, filed on Oct. 31, 1997.
(60) Provisional application No. 60/030,107, filed on Nov. 1, 1996, provisional application No. 60/030,106, filed on Nov. 1, 1996, provisional application No. 60/030,105, filed on Nov. 1, 1996, provisional application No. 60/030,104, filed on Nov. 1, 1996, provisional application No. 60/030,108, filed on Nov. 1, 1996, and provisional application No. 60/029,923, filed on Nov. 1, 1996.

(51) Int. Cl.$^7$ ................................................ H04N 5/50
(52) U.S. Cl. ........................ 348/569; 345/340; 345/342
(58) Field of Search .................................. 348/559, 584, 348/564, 588, 714; 345/340, 344, 342

(56) References Cited

U.S. PATENT DOCUMENTS

| | | |
|---|---|---|
| 4,953,027 | 8/1990 | Tong et al. |
| 5,715,515 * | 2/1998 | Akins, III et al. ................. 455/4.1 |
| 5,754,258 * | 5/1998 | Hanaya et al. ..................... 348/734 |
| 5,841,435 * | 11/1998 | Dauerer et al. .................... 345/339 |
| 6,058,459 * | 5/2000 | Owen et al. ....................... 711/151 |
| 6,066,728 * | 12/2000 | Haman et al. ..................... 345/327 |

FOREIGN PATENT DOCUMENTS

| | | |
|---|---|---|
| 0 276 884 | 8/1998 | (EP). |
| 0 280 582 | 8/1998 | (EP). |

* cited by examiner

Primary Examiner—Victor R. Kostak
(74) Attorney, Agent, or Firm—Gerald E. Laws; W. James Brady, III; Frederick J. Telecky, Jr.

(57) ABSTRACT

An on-screen display system in which a CPU generates windows in a working memory space also provides for real time calculation of window addresses in the working memory space. This can eliminate the need for a separate frame buffer memory.

14 Claims, 5 Drawing Sheets

REAL TIME WINDOW ADDRESS CALCULATION FOR ON-SCREEN DISPLAY

This application is a divisional of U.S. Ser. No. 08/962,514 (TI-24731) filed on Oct. 31, 1997 and hereby incorporated herein by reference. The aforementioned copending application claims priority under 35 U.S.C. 119(e)(1) of U.S. provisional application Ser. Nos. 60/030,107 (TI-24441P), 60/030,106 (TI-24442P), 60/030,105 (TI-24443P), 60/030,104 (TI-24630P), 60/030,108 (TI-24646P) and 60/029,923 (TI-22990P), all filed on Nov. 1, 1996 and hereby incorporated herein by reference.

FIELD OF THE INVENTION

The invention relates generally to digital data processing, and more particularly, to digital data processing associated with on-screen displays.

BACKGROUND OF THE INVENTION

Conventional on-screen display (OSD) systems typically use a memory as a frame buffer for storing the actual display to be generated for a television screen or other display. The CPU generaters display information, for example a window, in a working memory space that is separate from the frame buffer memory. The CPU writes the window to a desired location in the frame buffer memory during a refresh or blanking period. Disadvantageously, such use of separate memory spaces can be expensive.

The present invention provides for real time calculation of window addresses in the CPU's working memory space. Such real time address calculation can, according to exemplary embodiments of the invention, advantageously eliminate the need for a separate frame buffer memory.

DETAILED DESCRIPTION

The following describes OSD (e.g., for use with a digital television set-top box) with real-time window address calculations according to the invention. Most display systems use a frame mode for OSD so that the CPU working space and the display memory are separate. With a hardware windowing mode depicted in FIG. 1, there is no duplication of memory space for the CPU 220 and OSD controller 270. Hardware windowing reduces memory transfer, power dissipation and system cost.

Figure 1:
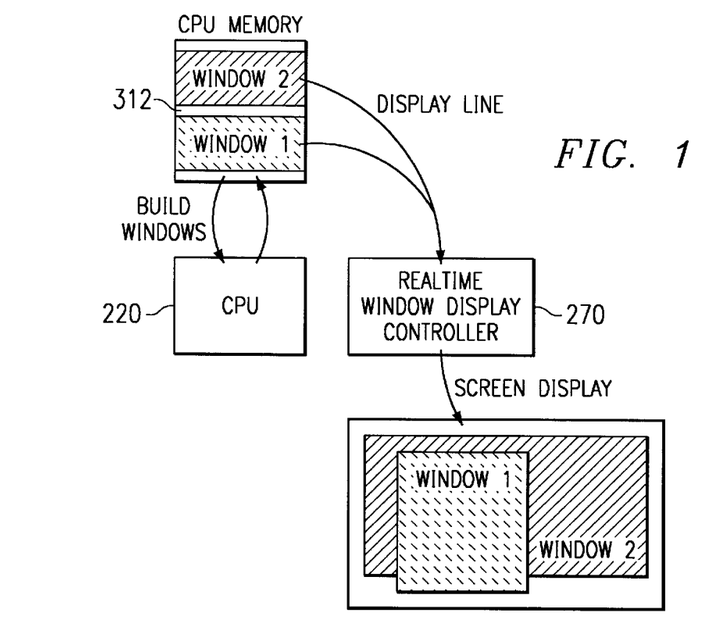
FIG. 1 depicts a high level architectural diagram of an OSD system of the present invention.

The CPU 220 builds each window separately in a different portion of the SDRAM 312. Each window has its own display attributes, i.e. display mode, resolution and position; the number of bits to display a pixel of the window 1 and 2 can be different. The picture is composed directly by the hardware that reads the contents of the windows from the CPU memory space 312. The OSD controller 270 hardware reads only the data required to compose the current frame.

The OSD controller 270 reads sequentially each segment of the window 1 and 2 line by line from the left upper corner to the right lower corner. For each new line, the OSD controller 270 calculates the start address and block size for each segment of windows that make up the line. During display the OSD controller 270 transfers the contents of the windows from the CPU memory 312 segment by segment and changes the attribute of display for each transition of a window.

Figure 2:
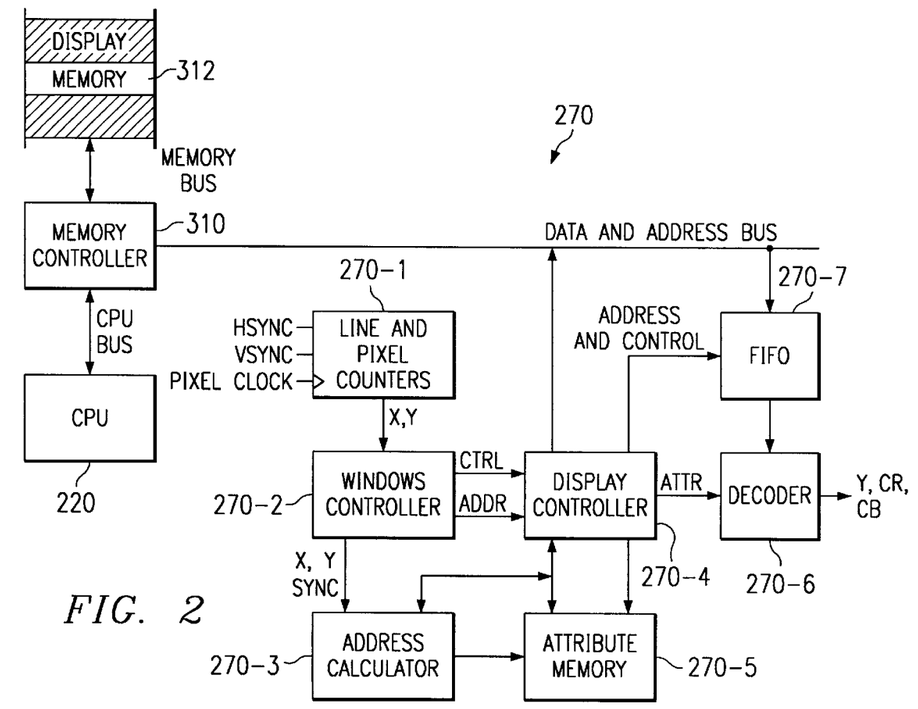
FIG. 2 depicts in more detail some of the connections and blocks depicted in FIG. 1.

As depicted in FIG. 2, the OSD 270 and the CPU 220 communicate with the display memory (SDRAM) 312 via the memory controller 310. The OSD memory addresses are generated by the display controller 270-4. The FIFO 270-7 receives each segment of the windows to be displayed. The OSD controller 270 is composed of the following blocks.

The pixel counter 270-1 is incremented by the pixel clock and line counter when the pixel counter is at the end of the line. It generates X, Y, that represent the pixel position on the screen and synchronization signals Hsync and Vsync to control screen display.

The windows controller 270-2 contains the position X and Y of each window to be displayed on the current screen. The controller compares X, Y to the position of the windows and indicates to the display controller 270-4 each window transition and the window number.

The address calculator 270-3 calculates the start address and block size of each segment of a window for each new line and pushes the values onto a stack in the attribute memory 270-5.

For each new window transition, the display controller 270-4 reads the new attribute from the attribute memory 270-5. The controller manages the FIFO 270-7. For each new line, the FIFO is loaded block by block with the segments of windows that make up the line. When the FIFO 270-7 is full, the controller 270-4 waits for the next access.

For each pixel, the decoder 270-6 extracts from the FIFO 270-7 the number of bits corresponding to the current pixel to be displayed. It transforms data bits into pixels.

Figure 3:
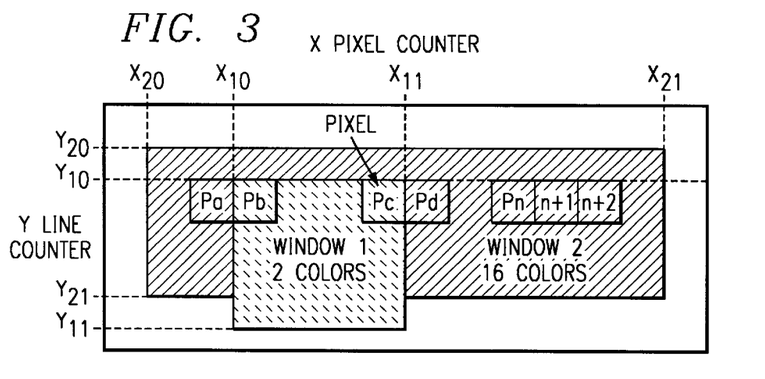
FIG. 3 depicts two windows having different color schemes that illustrate how the OSD system of the present invention displays windows.

FIG. 3 shows an example of a display with two overlapped windows. Window 2, in back, is a bit map with 16 colors per pixel, so a pixel requires 4-bits in the frame memory to define the code of the color. Window 1 on top is a bit map with 2 colors per pixel, so a pixel requires 1-bit in the frame memory.

The position and dimension of the window 1 is given by the attributes X_10, X_11, Y_10, Y_11. Horizontally the number of pixel is: X_11–X_10. Vertically the number of lines is: Y_11–Y_10. Same for window 2 with X_20, X_21, Y_20 and Y_21.

The line at Y10 contains 3 segments. The first segment (segment 1) at the beginning of window 2, starts in position X20 and ends in pixel Pa. The second segment (segment 2), which corresponds to window 1, is displayed on top of window 2, starts in X10 and ends in pixel Pc. The third segment (segment 3), which corresponds to the end of the window 2, starts in pixel Pd and ends in X21. Segments 1 and 3 come from the memory space of window 2 and segment 2 from the memory space of window 1. The contents of the window 2 memory space between Pa and Pb are ignored and not transferred to the FIFO.

Figure 4:
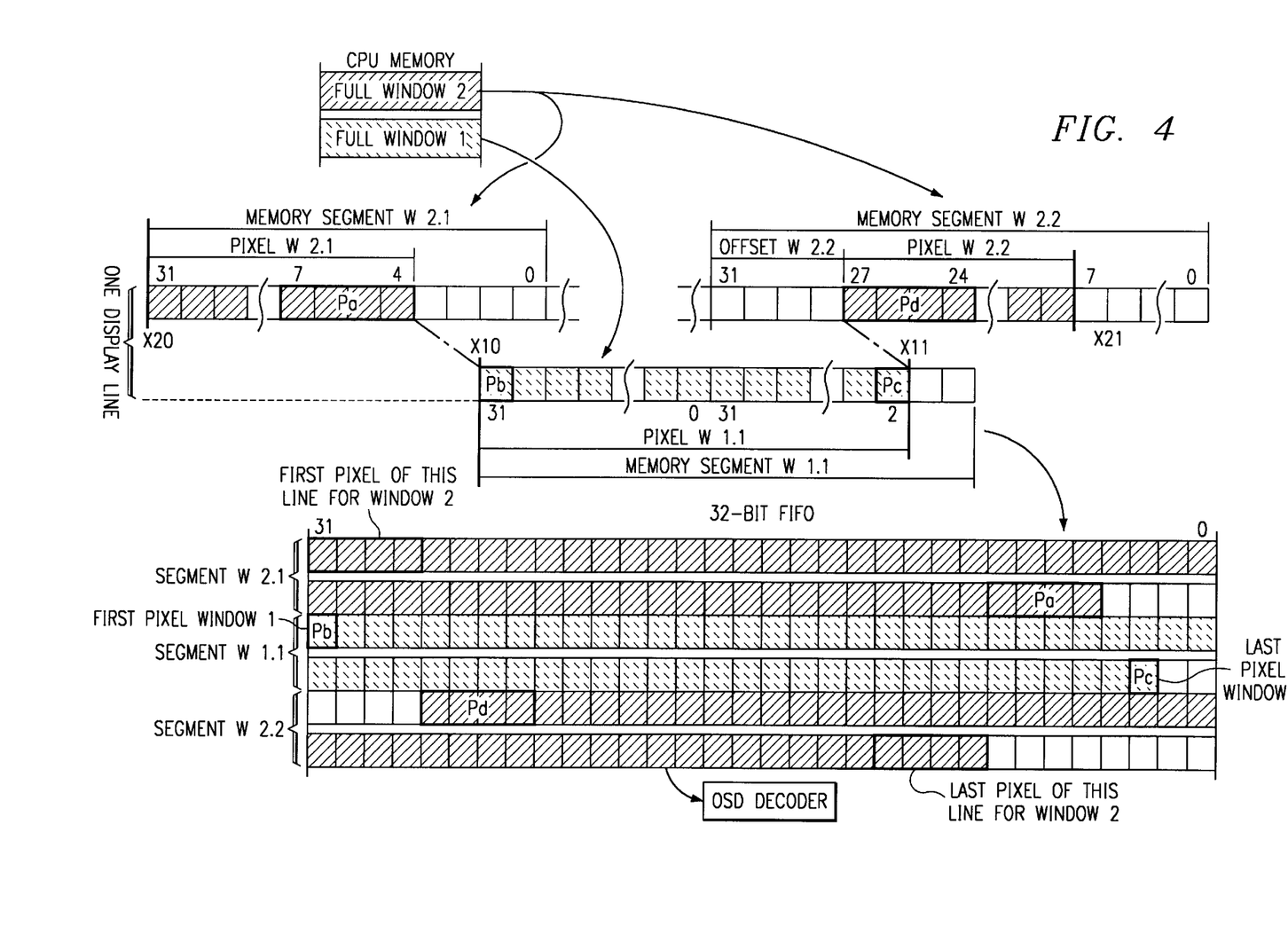
FIG. 4 depicts how the segments of a line in FIG. 3 are generated, assembled and stored in accordance with teachings of the present invention.

FIG. 4 details the process for this line and the flow from the memory to the FIFO. The CPU 220 has composed two windows in separate memory spaces. The windows are described line by line, each new line starts with a new 32-bit word. The first pixel of a line is aligned with the msb of the word. If the number of bits to describe the content of the line is not modulo 32, some bits of the word can be ignored. The window 2 has 4-bits per pixel, the first segment W2.1 contains 2 words but only 15, pixels. The last 4-bits are not used for display. The second segment W1.1 has 2 words, the window 1 has 1-bit per pixel and 62 pixels horizontally. The last 2-bits of the second word are ignored. Because the third segment W2.2 is not a beginning of a new line, the pixel Pd need not be aligned at the word boundary. In this example, Pd is the second pixel of the first word of this segment, and this pixel position is indicated in FIG. 4 by "offset W2.2".

Figure 5:
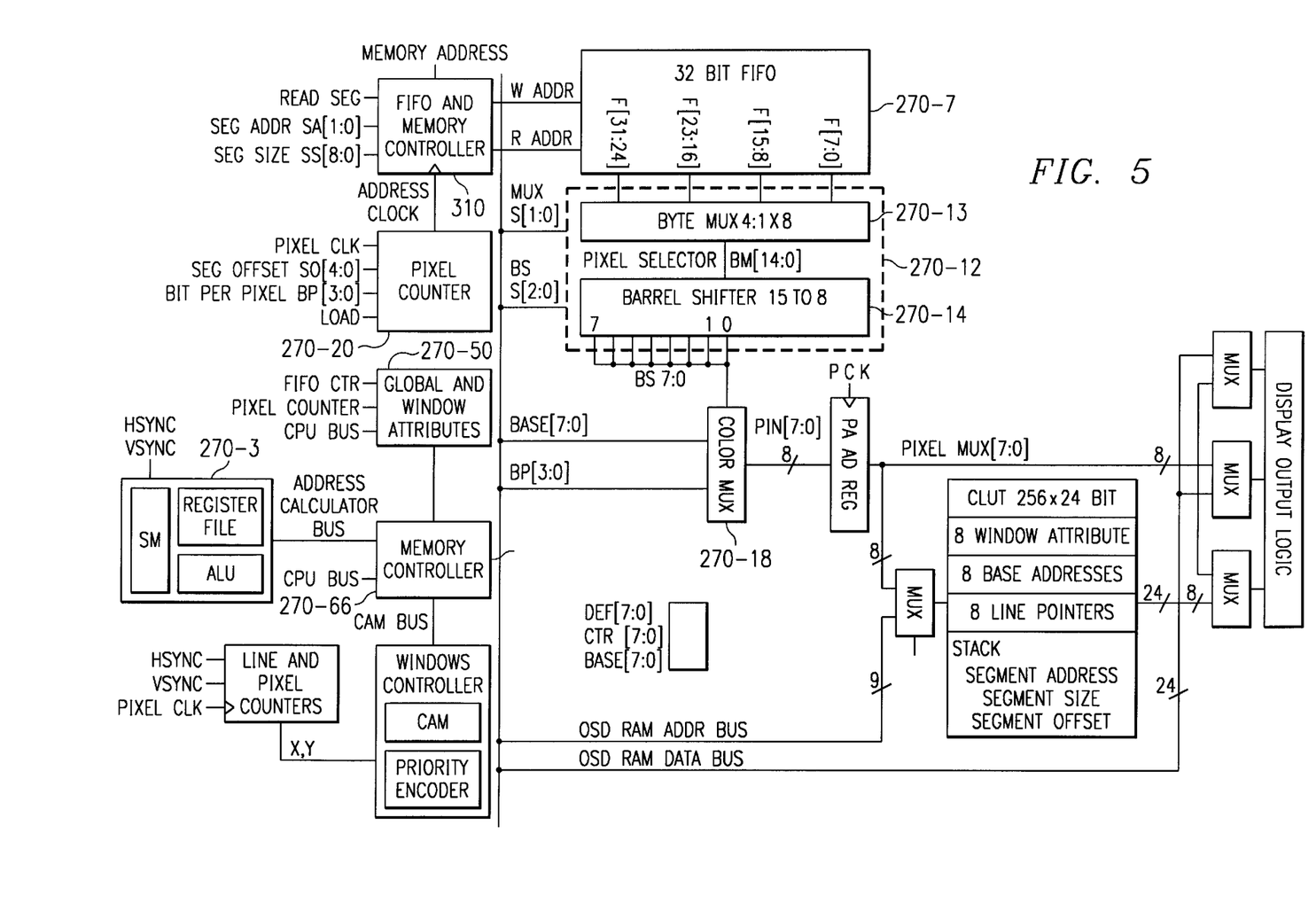
FIG. 5 depicts in more detail portions of the blocks depicted in FIG. 2.

FIG. 5 shows different blocks of OSD controller 270 described previously. The details of the blocks for the window controller, display controller and decoder are as follows.

The FIFO 270-7 is a 32-bit dual port memory. The data is received from the main memory SDRAM and used by the Pixel selector 270-12. The transfer requests and addresses generation are controlled by the FIFO memory controller. It generates write and read addresses and control signals to the FIFO and the memory address and control to the traffic controller that access the SDRAM. The OSD data is read by segment of windows in a burst. For each new segment, the controller 270 accesses the attributes RAM to get a memory address and segment size.

Figures 6, 7:
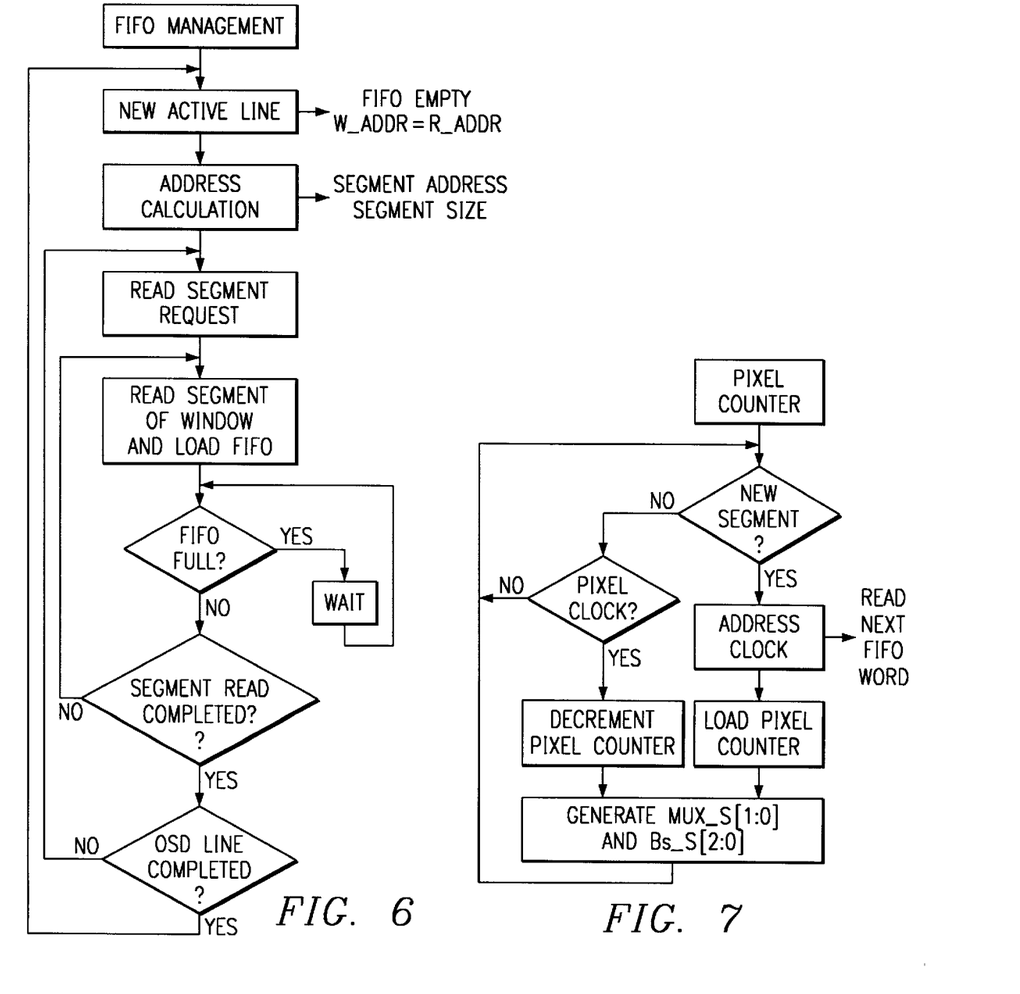
FIG. 6 depicts the FIFO management flow for transfers from the CPU memory.
FIG. 7 depicts the two cases for starting a new segment or pixel clock.

FIG. 6 shows the FIFO management flow for the transfers from the SDRAM.

At the beginning of each new active line, the FIFO is empty and the Read and Write pointers are equal.

The address calculator calculates the start address of each segment of the windows that compose the current line and stores the addresses in the Attribute RAM.

The FIFO controller generates the Read segment request to the OSD Memory controller 270-66 in order to read the first segment address Sa[23:0] and segment size Ss[8:0] stored previously into the attribute RAM.

If the segment is larger than the size of the FIFO the controller splits the segment by burst. When the FIFO is full or cannot contain the block the FIFO controller is waiting.

When the full segment of window has been read the FIFO controller generates a request to access the next segment composing the current line. The pixel selector reads the data word by word F[31:0]. The number of bits per pixel or pixels per word can vary for each segment of window so the time between two accesses to the FIFO is variable. A new segment always starts with a new word. As shown FIGS. 3 and 4, window 1 overlaps window 2, and Pa is the last pixel of window 2 for this segment. In this case a part of the word of the first segment of window 2 will not be used by the pixel selector to generate a pixel. Address clock signal is generated to access a new word into the FIFO.

For the pixel counter 270-20, there are two different cases (depicted in FIG. 7): a new segment start or a new pixel clock. When a new segment of window starts the pixel counter logic generates the address clock signal to the FIFO controller in order to transfer the first word of this segment to the pixel selector.

The window controller generates the "Load" signal to indicate a window transition. The "Load" signal transfers the Segment offset So[4:0] corresponding to this new segment of window to the pixel counter.

The segment W2.1 in FIG. 4 is the left border of the window, so the associated segment offset So[4:0]=0. Window 2 has 4-bits per pixel, the value of the pixel counter that generates Mux_S[1:0] concatenated with Bs_S[2:0] will be (So[4:0] −Bp[3:0])=28 to point to the first pixel of this word.

The segment W2.2 of FIG. 4 is overlapped partly with window 1. The first pixel of the first word is not displayed. So[4:0]=(0−Bp[3:0])=28. The pixel counter will be So[4:0]−Bp[3:0]=24 to point to the second pixel of this word.

The "Pixel clock" decrements the Pixel counter by 0, 1, 2, 4 or 8 depending of the number of bits per pixel Bp[3:0] of the current window. An address clock signal is generated when the Pixel counter is equal to zero.

The pixel selector 270-12 receives the 32-bit data word from the FIFO outputs F[31:0]. It contains two parts, a byte multiplexer 270-13 and a barrel shifter 270-14. The byte multiplexer selects one of the four bytes F[31:24], F[23:16], F[15:8] or F[7:0] as function of Mux_S[1:0] as shown Table 1. The barrel shifter shifts the byte to the right by 0 to 7 bit positions, as shown in Table 2.

Table 1, 2 and 3: Pixel Selector Control

Byte Mux 4:1 × 8

| Control Mux_S[1:0] | Bm[7:0] |
|---|---|
| 1 1 | F[31:24] |
| 1 0 | F[23:16] |
| 0 1 | F[15:8] |
| 0 0 | F[7:0] |

Shifter 4,2,1

| Control Bs_S[2:0] | Bs[7:0] valid Outputs |
|---|---|
| 1 1 1 | Bm[7] |
| 1 1 0 | Bm[7 6] |
| 1 0 1 | Bm[7 6 5] |
| 1 0 0 | Bm[7 6 5 4] |
| 0 1 1 | Bm[7 6 5 4 3] |
| 0 1 0 | Bm[7 6 5 4 3 2] |
| 0 0 1 | Bm[7 6 5 4 3 2 1] |
| 0 0 0 | Bm[7 6 5 4 3 2 1 0] |

-continued

Table 1, 2 and 3: Pixel Selector Control

Pixel counter

| Mux_S[1:0] | Bs[7:0] = |
|---|---|
| 0 0 | |
| 0 1 | |
| 1 0 | |
| 1 1 | |

| Bs_S[2:0] | | | | |
|---|---|---|---|---|
| 1 1 1 | F[31] | F[23] | F[15] | F[7] |
| 1 1 0 | F[31:30] | F[23:22] | F[15:14] | F[7:6] |
| 1 0 1 | F[31:29] | F[23:21] | F[15:13] | F[7:5] |
| 1 0 0 | F[31:28] | F[23:20] | F[15:12] | F[7:4] |
| 0 1 1 | F[31:27] | F[23:19] | F[15:11] | F[7:3] |
| 0 1 0 | F[31:26] | F[23:18] | F[15:10] | F[7:2] |
| 0 0 1 | F[31:25] | F[23:17] | F[15:9] | F[7:1] |
| 0 0 0 | F[31:24] | F[23:16] | F[15:8] | F[7:0] |

The 5-bit pixel counter generates Mux_S[1:0] & Bs_S[2:0]. Table 3 indicates the value of Bs[7:0] as a function of the pixel counter value. This table combines Tables 1 and 2.

The color multiplexer 270-18 receives data Bs[7:0] from the barrel shifter and Base[7:0] from the attribute register. It is controlled by the number of bits per pixel Bp[3:0], coming from the attribute register. According to Table 4 the multiplexer selects 0, 1, 2, 4 or 8 bits of the Base address color Base[7:0] and its complement in Bs[7:0] in order to form the outputs Pm[7:0] (Pm=Pixel_Mux).

TABLE 4

Pixel Multiplexer
Pixel Multipler outputs

| Bit per Pixel Bp[3:0] | | | | Mux output |
|---|---|---|---|---|
| 8 | 4 | 2 | 1 | Pm[7:0] |
| 1 | 0 | X | X | X | X | Def[7:0] |
| X | 1 | X | X | X | X | Cur[7:0] |
| 0 | 0 | 0 | 0 | 0 | 0 | Base[7:0] |
| 0 | 0 | 0 | 0 | 0 | 1 | Base[7:1] & Bs[0] |
| 0 | 0 | 0 | 0 | 1 | 1 | Base[7:2] & Bs[1:0] |
| 0 | 0 | 0 | 1 | 1 | 1 | Base[7:4] & Bs[3:0] |
| 0 | 0 | 1 | 1 | 1 | 1 | Bs[7:0] |

When the cursor is detected by the window controller, Base[7:0] is equal to the curser color . When the display does not contain any OSD window or motion video, the default color is selected . During an OSD window, the Base[7:0] comes from the current window attribute register.

The output of the multiplexer generate Pixel_Mux[7:0] is used in the bit-map mode to select one of the 256 colors of a color lookup table, CLUT. In graphic mode or still video picture mode, Pixel_Mux[7:0] is one color component, Luma or Chroma. Grafic mode requires three color components per pixel, the Pixel_clock is 3 times faster than in bit-map. In still video picture, 2 color component are required during one pixel duration. The display output is three 8-bits words, Y, Cr and Cb.

The global attribute register 270-50 contains cursor and default color, these values are set by the CPU. The window attribute register contains the attribute for the current window:

Display mode: bit-map, graphic, still video or empty.

Number of bit per pixel or color component: 0, 1, 2, 4 or 8 bits.

The bit-map CLUT base address.

Blending . . .

The attributes are located in the Attribute RAM. The window attributes change at every window transition. The segment attributes are sent through this block to the FIFO controller or pixel counter.

Figure 8:
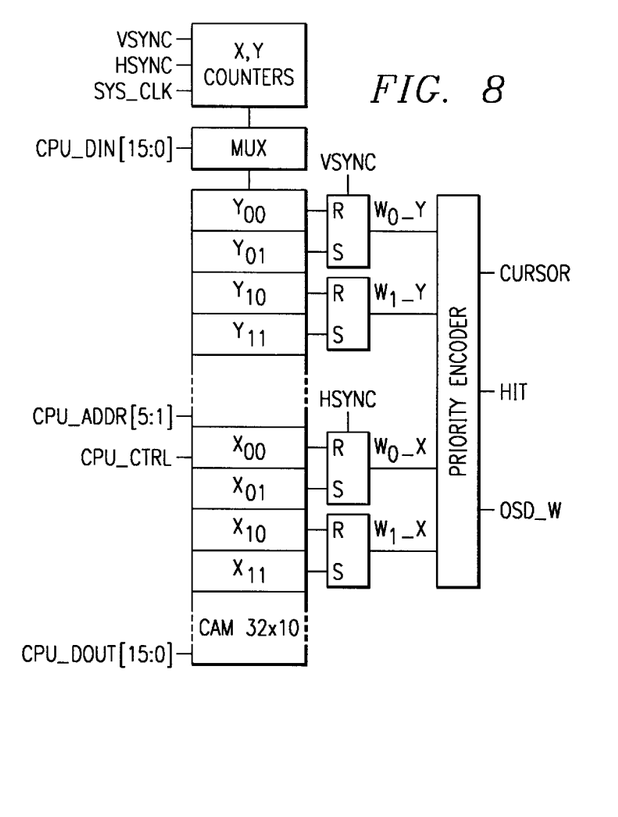
FIG. 8 depicts a portion of the window controller of the present invention.

The windows controller 270-2 contains a content addressable memory CAM, flip flop and priority encoder (FIG. 8). The CAM contains the attributes of position and size of the windows to be displayed on the current frame. Each window requires 4 words to indicate horizontally the coordinates of the first and last pixel and vertically the coordinates of the first and last line. A 32_words CAM supports 8 windows.

The CAM compares the value of the pixel and line counters respectively X and Y. When Y counter matches a value YnO, a new window starts vertically and the corresponding RS flip-flop is set Wn_Y=1. When Y counter matches a value Yn1, the corresponding window ends vertically and the RS flip-flop Wn_Y is reset. The process is the same horizontally. Wn_Y and Wn_X are combined to indicate that the X, Y counter crosses an active window. The indices "n" indicate the window number. Several windows can be overlapped, the priority encoder defines the display order on the screen. The indices "n=0" correspond to the cursor always on top. Outputs of the priority encoder are HIT and OSD_W; HIT generates the attribute clock and OSD_W selects the attribute memory address corresponding to the active window. The HIT signal generates an access request to the attribute memory at the address given by OSD_W. The attributes of the active window are transferred to a window attribute register.

The CAM can be accessed by the CPU to set the position of the windows during initialization. The address calculator accesses the CAM each line for real time address calculation.

```
Pseudo code for the window controller:
Y = Y + 1;                                    Increment line number when end of line
                                              Y = 0 when end of frame
    FOR n = 0 to 7                            Check if the current line number Y cross one or
                                                  several windows
        IF Y = Yn0    THEN    Wn_Y = 1;       Check if the window "n" starts vertically
            ELSE IF Y = Yn1   Wn_Y = 0;       Check if the window "n" ends vertically
    END;
                                              All windows with Wn_Y = 1 are vertically valid and
                                                  cross the current line
X = X + 1;                                    Increment pixel number
    FOR n = 0 to 7                            Check if the current pixel number X cross one or
                                                  several windows
        IF X = Xn0    THEN    Wn_X = 1;       Check if the window "n" starts horizontally
            ELSE IF X = Yn1   Wn_X = 2;       Check if the window "n" ends horizontally
```

```
        END;                                            Windows with Wn_X = 1 are horizontally valid and
                                                            cross the current pixel number
        FOR n = 0 to 7                                  Define valid window: check if the current pixel
                                                            crosses a window"
            Wn_XY = Wn_X AND Wn_Y;                      Check all windows that contain the current pixel
        END;
        M = 8                                           Define which window is visible
        FOR n = 7 to 0
            IF Wn_XY = 1       THEN      M = n;            Check valid window with the lower "n"
        END;
        T = M;                                          The current pixel is in the window M. If M = 8 the pixel
                                                            is not in a window
        IF T(n − 1) < OR > T THEN HIT = 1;              If the window number of the previous and current
                                                            pixel and are different, HIT indicate a window
                                                            transition
        IF M = 0           THEN      Cursor = 1         Generate Cursor or OSD_W address
                           ELSE      OSD_W = M;
        END;
END;
```

The memory controller 270-66 manages the accesses to the Attribute RAM and CAM. The accesses are:

CPU access:

CAM: The CPU program position and priority of the windows. This access is done during vertical blanking or when before OSD display.

Attribute RAM: to load the CLUT, windows attributes and Base address.

Address calculator access: During horizontal blanking to the CAM and Attribute RAM to calculate the segment address, size and offset.

FIFO controller access: When read segment request is generated, to the Attribute RAM to read the next segment address and size for data transfer between SDRAM and FIFO.

Window controller access: Each window transition to the Attribute RAM to read window attribute and segment offset.

The address calculator 270-3 is the key element of the hardware windowing system. It calculates the attributes of each of the segments making up the current display line (first address, size in words and offset of the first pixel) and stores the values in the segments stack. The address calculator (AC) receives vertical and horizontal synchronization signals that indicate the beginning of a new frame or a line.

For each new frame the AC transfers the base addresses Ba0 to Ba7 to the corresponding line pointers L0 to L7. The line pointers are located in the Attribute RAM. Ba(n) is the base address of window n in the SDRAM.

Figure 9:
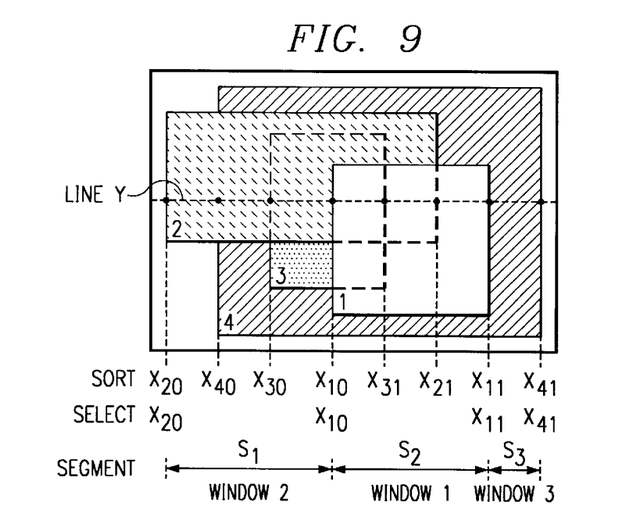
FIG. 9 depicts four overlapped windows.

FIG. 9 shows 4 overlapped windows, the line Y crosses horizontally all windows from start to end. For each line of the active display area, the AC gets the active windows for the current line from the window controller, which provides an 8-bit value. A "1" represents an active window, the first bit is window 0 and last bit window 7: W0_XY . . . W7_XY=0,1,1,1,1,0,0,0.

For each active window (Wn_XY=1), the AC reads the contents Xn0 and Xn1 of the CAM, and sorts window indices in the order of transitions from the left to the right. For the given example the sorted values are: X20, X40, X30, X10, X31, X21, X11, X41 (X20, is the lower value X41 the bigger).

From the left to the right when a window starts the AC selects in that window the values with lower indices (lower index n corresponds to a higher priority window). For example the first window starts in X20, and the first selection is done by selecting only the values between X20 and X21 having an index n <2, so the values X40, X30, X31 are eliminated, and the value X10 is maintained. The next window start is X10; there are no values with lower indices between X10 and X11. There is no remaining window start after X11, so X41 is valid. The selected active transitions are:

X20, X10, X11, X41

The line Y thus has 3 segments: S1 between X20 and X10; S2 between X10 and X11; and S3 between X11 and X41. S1 is window 2, S2 is window 1 and S3 window 4. The AC calculates the segment address. For each window start the segment address Sa[23:0] is equal to the line pointer Ln.

Example: S1: Sa[23:0]=L2; S2: Sa[23:0]=L1;

The last segment S3 is the end of window 4. S3 starts in X11, so the AC calculates the number of pixels and entire words from the beginning of window 4 to X11. The number of pixels is (X11−X40). The number of words is (X11−X40) *K4/32, where K4 is the number of bits per pixel for window 4 and 32 is the number of bits per word. This value is added to the line pointer (L4) to give the segment address S3: Sa[23:0].

The block (segment) size is the entire number of words between 2 transitions. The offset that points the first pixel is the remainder.

S1: (X10−X20)*K2/32→Ss[8:0]and So[4:0]
S2: (X11−X10)*K1/32→Ss[8:0]and So[4:0]
S3: (X41−X11)*K4/32→Ss[8:0]and So[4:0]

The entire part (integer part) of the equation gives the number of words Ss[8:0]. The decimal part (remainder) is the offset So[4:0]. If So[4:0]>0 the number of words is Ss[8:0]+1.

In the last step, the line pointer is incremented by the number of entire words to describe a line of the active windows.

L1=L1+(X11−X10)*K1/32 (+1 if the remainder is >0)
L2=L2+(X21−X20)*K2/32 (+1 if the remainder is >0)
L3=L3+(X31−X30)*K3/32 (+1 if the remainder is >0)
L4=L4+(X41−X40)*K4/32 (+1 if the remainder is >0)

Figure 10:
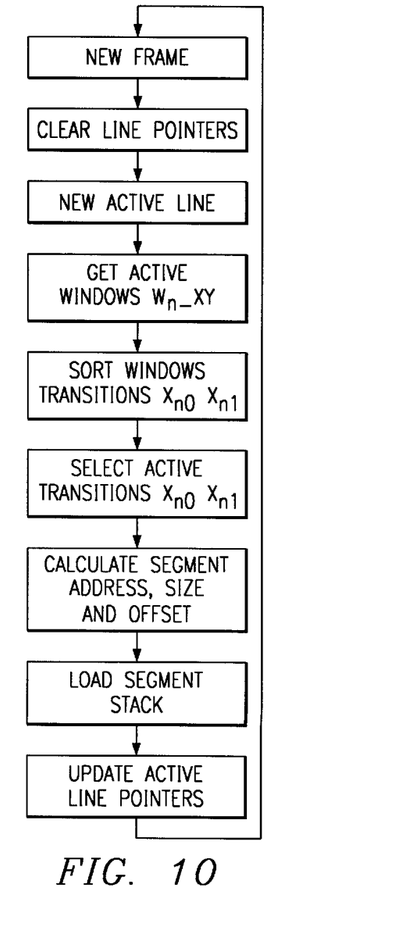
FIG. 10 depicts the major steps of the address calculation of the present invention.

A flowchart of the address calculator steps is depicted in FIG. 10. Thus, the OSD system 270 simultaneously displays different kinds of pictures: bit-map, graphic, still video picture, motion video picture or background color. Each picture is in a different window that is managed by OSD hardware.

A display memory organized by windows is located in an SDRAM 312; the same memory space in the SDRAM 312 is used for both the display frame memory and for the CPU working area.

The address calculator calculates the attributes of each of the segments that make up the current display line (first address, size in words and offset of the first pixel) and stores these values in the segments stack.

The OSD data is read in a burst by window segment. For each new segment, the controller accesses the attributes RAM to get a memory address and segment size.

Although exemplary embodiments of the invention are described above in detail, this does not limit the scope of the invention, which can be practiced in a variety of embodiments.

What is claimed is:

1. An on-screen display apparatus, comprising:

a data processor for generating a plurality of windows for on-screen display;

a memory coupled to said data processor for receiving therefrom and storing window information representative of said windows; and an on-screen display controller coupled to said memory, said on-screen display controller having an input for receiving information indicative of a current display line of the on-screen display, said on-screen display controller responsive to said current display line information for identifying segments of said windows that are to be displayed on said current display line and for obtaining from said memory portions of said window information that respectively represent said identified segments for use in producing said current display line, said on-screen display controller further comprising:

a windows controller for providing positional information indicative of respective positions of said windows in the on-screen display, said on-screen display controller responsive to said positional information for identifying said segments; and an address calculator coupled to said windows controller and responsive to said positional information for determining addresses for respectively accessing said information portions in said memory, wherein said address calculator is further responsive to said positional information for calculating sizes of the respective information portions.

2. The apparatus of claim 1, wherein at least some of said windows positionally overlap one another in the on-screen display.

3. The apparatus of claim 1, wherein said address calculator includes an input for receiving information indicative of data formats respectively used to represent said windows in said memory, said address calculator responsive to said positional information and said data format information for calculating said sizes of said information portions.

4. The apparatus of claim 3, wherein said data format information includes bit per pixel information.

5. The apparatus of claim 1, including a FIFO memory for receiving said information portions from said first-mentioned memory, and including a memory controller coupled to said first-mentioned memory and said FIFO memory and said address calculator, said memory controller responsive to said addresses for transferring said information portions from said first-mentioned memory to said FIFO memory.

6. The apparatus of claim 5, including a pixel selector coupled to said further memory for obtaining from said information portions stored in said FIFO memory pixel information representing pixels to be displayed in said current display line.

7. The apparatus of claim 1, wherein said windows controller is further for providing priority information indicative of which of a plurality of positionally overlapping windows is to be shown in the on-screen display, said on-screen display controller responsive to said positional information and said priority information for identifying said segments that are to be displayed on said current display line.

8. An on-screen display method, comprising:

generating a plurality of windows for on-screen display;

storing in a memory window information representative of said windows;

providing information indicative of a current display line of the on-screen display; and providing positional information indicative of respective positions of said windows in the on-screen display; and responsive to said current display line information, identifying segments of said windows that are to be displayed on said current display line, identifying said segments in response to said positional information, obtaining from said memory portions of said window information that respectively represent said identified segments for use in producing said current display line determining in response to said positional information addresses for respectively accessing said information portions in said memory, and calculating sizes of the respective information portions in response to said positional information.

9. The method of claim 8, wherein at least some of said windows positionally overlap one another in the on-screen display.

10. The method of claim 8, including providing information indicative of data formats respectively used to represent said windows in said memory, said calculating step including calculating said sizes in response to said positional information and said data format information.

11. The method of claim 10, wherein said data format information includes bit per pixel information.

12. The method of claim 8, wherein said obtaining step includes using said addresses to transfer the respective information portions from said memory to a FIFO memory.

13. The method of claim 12, including obtaining from said information portions stored in said FIFO memory pixel information representing pixels to be displayed in said current display line.

14. The method of claim 8, including providing priority information indicative of which of a plurality of positionally overlapping windows is to be shown in the on-screen display, said identifying step including identifying said segments responsive to said positional information and said priority information.

* * * * *